United States Patent
Hall et al.

(10) Patent No.: US 9,670,101 B2
(45) Date of Patent: *Jun. 6, 2017

(54) METAL DETECTIBLE CERAMIC TOOLING

(71) Applicants: Michelene Hall, East Rochester, NY (US); Thomas Blaszczykiewicz, Orchard Park, NY (US)

(72) Inventors: Michelene Hall, East Rochester, NY (US); Thomas Blaszczykiewicz, Orchard Park, NY (US)

(73) Assignee: Thomas Blaszczykiewicz, Orchard Park, NY (US)

(*) Notice: Subject to any disclaimer, the term of this patent is extended or adjusted under 35 U.S.C. 154(b) by 777 days.

This patent is subject to a terminal disclaimer.

(21) Appl. No.: 13/890,743

(22) Filed: May 9, 2013

(65) Prior Publication Data

US 2014/0162864 A1 Jun. 12, 2014

Related U.S. Application Data

(60) Provisional application No. 61/644,610, filed on May 9, 2012.

(51) Int. Cl.
| | | |
|---|---|---|
| *C04B 35/48* | (2006.01) | |
| *C04B 35/64* | (2006.01) | |
| *C04B 35/645* | (2006.01) | |
| *C04B 35/111* | (2006.01) | |
| *C04B 35/119* | (2006.01) | |
| *C04B 35/486* | (2006.01) | |
| *C04B 35/50* | (2006.01) | |
| *C04B 35/56* | (2006.01) | |
| *C04B 35/58* | (2006.01) | |
| *H01F 1/28* | (2006.01) | |

(52) U.S. Cl.
CPC ........ *C04B 35/6455* (2013.01); *C04B 35/111* (2013.01); *C04B 35/119* (2013.01); *C04B 35/486* (2013.01); *C04B 35/50* (2013.01); *C04B 35/5607* (2013.01); *C04B 35/5611* (2013.01); *C04B 35/58064* (2013.01); *C04B 35/58071* (2013.01); *C04B 35/58078* (2013.01); *H01F 1/28* (2013.01); *C04B 2235/3225* (2013.01); *C04B 2235/3272* (2013.01); *C04B 2235/3275* (2013.01); *C04B 2235/3279* (2013.01); *C04B 2235/405* (2013.01); *C04B 2235/652* (2013.01); *C04B 2235/6562* (2013.01); *C04B 2235/664* (2013.01)

(58) Field of Classification Search
CPC ..... C04B 35/48; C04B 35/64; C04B 35/6455; C04B 35/645
See application file for complete search history.

(56) References Cited

U.S. PATENT DOCUMENTS

| | | | | |
|---|---|---|---|---|
| 3,901,717 | A * | 8/1975 | Revaz | A44C 17/00 428/539.5 |
| 4,606,767 | A * | 8/1986 | Nagato | C22C 29/10 419/15 |
| 5,186,854 | A * | 2/1993 | Edelstein | C23C 14/0688 204/192.2 |
| 5,624,542 | A * | 4/1997 | Shen | B01D 53/228 204/283 |
| 5,708,956 | A * | 1/1998 | Dunmead | C22C 1/058 419/12 |
| 5,993,511 | A * | 11/1999 | Piro | C22C 1/1026 75/235 |
| 7,740,814 | B2 * | 6/2010 | Westin | B01J 23/755 423/115 |
| 2005/0236407 | A1 | 10/2005 | Aisenbrey | |
| 2007/0205529 | A1 | 9/2007 | May et al. | |

FOREIGN PATENT DOCUMENTS

JP 2007-180289 * 7/2007

OTHER PUBLICATIONS

Translation for JP 2007-180289, Jul. 12, 2007.*

* cited by examiner

*Primary Examiner* — Carol M Koslow
(74) *Attorney, Agent, or Firm* — C. John Brannon; Brannon Sowers & Cracraft PC

(57) ABSTRACT

A method for producing a metal detectible ceramic, including mixing a first amount of ceramic material with a second metal oxide to define an admixture, forming the admixture into a green body, sintering the green body to yield a densified body, wherein the densified body has a plurality of metallic particles distributed therethrough, and wherein the densified body is detectible by a metal detector.

8 Claims, No Drawings

METAL DETECTIBLE CERAMIC TOOLING

CROSS-REFERENCE TO RELATED APPLICATIONS

This application claims priority to U.S. provisional patent application Ser. No. 61/644,610, filed May 9, 2012, and to U.S. provisional patent application Ser. No. 61/752,086, filed Jan. 14, 2013.

TECHNICAL FIELD

The novel technology disclosed herein relates generally to the field of ceramic engineering and, more particularly, to a sintered ceramic material that can be detected through conventional metal detection techniques.

BACKGROUND

Tooling involved in the production of food and pharmaceuticals is typically metallic. Although ceramic materials have superior compressive properties, they are brittle and tend to chip. Thus, ceramic tooling is considered unsuitable for use with food and/or pharmaceuticals, since ceramic chips or fragments are difficult to detect and can contaminate the foodstuffs and/or pharmaceutical materials. Thus, there remains a need for ceramic tooling enjoying superior compression strengths along with easy detection of chips and fragments for screening and removal. The present novel technology addresses this need.

DETAILED DESCRIPTION

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated device and such further applications of the principles of the novel technology as illustrated therein being contemplated as would normally occur to one skilled in the art to which the novel technology relates.

The present novel technology relates to ceramic or cermet compositions that may be formed into sintered and densified ceramic bodies that enjoy the physical toughness, strength and wear resistance of ceramics while being detectible by conventional metal detection techniques. These cermet compositions may then be formed into such bodies as metal-detectible ceramic tooling or the like, thus offering improved safety features by increased ability to detect any small contaminate.

In one embodiment, the cermet composition includes a ceramic matrix phase such as $ZrO_2$, yttria stabilized zirconia (YTZ), $Gd_2O_3$, and combinations thereof, with a metallic phase such as Ni, Fe, Co, permalloy, Mu-metal, and combinations thereof, dispersed therein. The metallic phase is typically introduced in oxide form for reduction to metallic form during processing, to avoid mixing issues arising from significant density differences as well as metallic species chemically interacting with oxide species at elevated temperatures.

The metallic phase may be an alloy, and the alloy may be introduced as metal alloy particles, particles of oxidized alloy, or as oxides of the constituent metals for reduction and subsequent alloying of the resulting metals. The metallic phase typically has a high magnetic permeability $\mu$ of at least about $1\times10^{-4}$ H/m with a relative permeability $\mu/\mu_o$ of at least about 100, more typically $\mu$ being at least about $5\times10^{-3}$ H/m and $\mu/\mu_o$ at least about 4000, still more typically $\mu$ being at least about $1\times10^{-2}$ H/m and $\mu/\mu_o$ at least about 8000, and yet more typically $\mu$ being about $2.5\times10^{-2}$ H/m and $\mu/\mu_o$ 20,000. In some cases, $\mu/\mu_o$ may exceed 50,000. In other cases the metallic phase typically has a high magnetic permeability $\mu$ of at least about $1\times10^{-4}$ H/m with a relative permeability $\mu/\mu_o$ of at least about 8000.

Typically, the matrix and metallic phase materials are provided as precursor powders, with the metallic phase present in sufficient quantity to yield between about 1 volume percent and 20 volume percent metallic particles to the resultant cermet body, with about 80 to about 99 volume percent of the powder giving rise to the ceramic matrix phase, and with about 1 to about 8 weight percent of organic additives. A typical composition has less than 10 volume percent of the powder that gives rise to the metallic phase, with the balance being given to the powder giving rise to the ceramic matrix phase and, optionally a small amount of organic additives. If the powder giving rise to the metallic phase is a reducible material (e.g., a metal oxide), the volume percent of initial precursor powder is typically appropriately adjusted to compensate for the loss of the species (e.g., oxygen) that is removed during firing in a reducing atmosphere.

Typically, the matrix phase is a stable, structural ceramic, such as $ZrO_2$, yttria stabilized zirconia (YTZ), $Gd_2O_3$, or the like, and may include such materials as the various stabilized zirconias, zirconia-toughened alumina, alumina, $TiB_2$, $ZrB_2$, $HfB_2$, $TaB_2$, TiC, $Cr_3C_2$, and the like, and mixtures thereof.

The cermet composition may be prepared by any process that yields a monolithic part, typically having a well-blended mixture of the ceramic matrix phase and the oxide precursor phase, that will yield the metallic phase upon firing in a reducing environment. This may include preparation by slip casting, extrusion, freezing, and the like. One typically selected method is dry pressing, such as uniaxial pressing, cold isostatic pressing, hot isostatic pressing, and the like.

The appropriate powder preparation method is dictated by the selected method for processing the cermet composition. Dry pressing the powder giving rise to the ceramic matrix phase and the powder giving rise to the metallic phase are homogenized through mixing/blending to define an admixture. Additionally, organic additives such as surfactants, binders and the like may be present in small amounts to aid in powder processing, green body formation, and the like. Typically, these organic additives may be dissolved in a suitable liquid to be gradually added to the mixed inorganic powders in a shear granulation process. One typical powder preparation method includes preparing a suspension of the mixed inorganic powders and organic additives for drying to yield press ready granules.

In the case of an oxide powder precursor for yielding a metal alloy phase (i.e., a metal consisting of more than one element), it is preferred that the multiple oxide powders (such as iron oxide, nickel oxide, cobalt oxide, and combinations thereof) be calcined together at suitably high temperatures to generate a multi-elemental reaction product that is subsequently milled to a particle size that is appropriate for subsequent powder processing. Alternatively, predetermined amounts of constituent metals may be mixed and fused, with the fusion product allow later milled into a metallic powder precursor to yield an admixture.

The homogeneous admixture is then formed into a green body. Typically, the admixture is introduced into a mold and pressed into a green body. In some embodiments, small amounts of binder are introduced to assist the green body in retaining its shape after formation. The green body is then sintered at elevated temperatures and under controlled, reducing atmospheric compositions. A majority of the non-matrix metal oxide portion is reduced to yield a sintered cermet body having a predetermined amount of metallic particles dispersed in a sintered ceramic, typically oxide, matrix. In some instances, the admixture is introduced into a mold and then formed directly into a sintered cermet body, such as through a hot isostatic pressing (HIP) technique.

Generally, the admixture is heated at one to ten degrees Celsius per minute until a peak temperature between 1400 and 1700 degrees Celsius is reached. Then the admixture is held at this peak temperature for no greater than four hours. This is followed by a cool down by decreasing the temperature of the admixture between one to 5 degrees Celsius per minute until a temperature between 1200 and 1400 degrees Celsius is reached. The admixture is to dwell in this temperature range for duration of one to six hours. Then the admixture is to be brought down to room temperature at a rate of one to ten degrees Celsius per minute. The admixture may be processed in powder form, or as pressed into body. The metal particle size and distribution is influenced by the firing time and temperature. For example, longer firing times and/or greater firing temperatures typically yield larger metallic particles.

Once a sintered body is produced, it may be further machined into a desired shape. Further, the sintered body, before and/or after machining, may be soaked at an elevated temperature in a reducing atmosphere, such as annealing in hydrogen, to improve its ability to be sensed by a metal detector. Other generally appropriate reducing atmospheres may include a forming gas (i.e., hydrogen blended with an inert gas at various ratios), ammonia, vacuum, and combinations of the like.

In one embodiment, the green body is chemically activated to yield a densified ceramic matrix having a plurality of metallic particles dispersed therethrough.

In one embodiment, the sintered, densified cermet bodies are formed as pill-making tooling. The pill-making tooling enjoys the benefits of ceramic composition, including compression strength, toughness, durability, corrosion resistance, low coefficient of friction, low thermal expansion coefficient, and the like. The tooling enjoys the advantages of the advanced ceramic with the additional ability of being identified by conventional metal detection technology.

Other embodiments of the sintered, densified cermet bodies include equipment and tooling for the processing of foods and beverages, for pharmaceutical manufacture and processing, medical diagnostic devices and tools, military hardware, weapons, metal blades and cutting tools, industrial tooling and machinery, punches and dies, and the like.

In operation, tooling made from the novel cermet material functions similarly to traditional metal tooling, with the exception of typically requiring less lubricant and maintenance. This is advantageous for tooling associated with the production of pharmaceuticals and foodstuffs, such as pills, vitamins, and the like, as there is an associated reduction of discoloration (i.e., black marks) of the final product. Further, the novel cermet tooling is typically formed as a single piece, as contrasted to traditional multipiece tooling (i.e., metal punch having a ceramic tip), and thus the incidence of attached tooling pieces becoming dislodged during use is eliminated.

Typically, a production line utilizing the novel cermet tooling will have metal detectors for detecting and screening tooling chips from product. Typically, metal detectors employ an electric generator for producing an alternating electric field and a magnetometer for detecting magnetic fields. The electric generator produces an alternating electric field which generates eddy currents in electrically conductive materials; the eddy currents give rise to magnetic fields, which may be detected by the magnetometer. The tooling chip contaminants contain electrically conductive metallic particles which react to the magnetometer. Chips are thus removed from product upon detection. In some embodiments, the novel cermet material is sufficiently ferromagnetic as to be magnetically sortable from nonmagnetic product. Further, the novel cermet is advantageous in that, with the proper selection of allow having high magnetic permeability, it has an ability to be detected at smaller sized particles than ferrous tool steel. Thus the novel cermet allows for possible abrasion resistance of up to 4 to 5 times what is allowed by typical tool steel.

The following example is merely representative of the work that contributes to the teaching of the present novel article, and the novel material is not intended to be restricted by the following example.

EXAMPLE 1

This examples relates to a novel method of manufacturing the novel material starting with a Ni/Fe super alloy which is then ground up, milled and mixed with a zirconium ceramic powder to yield a slurry. Wherein the metallic alloy is present in generally sufficient quantities between typically between about 2 and about 8 weight percent of the total (more typically between about 0.5 and about 20 volume percent of resultant cermet body.) The slurry is then spray dried prior to yield a powder precursor, which may be formed into a green body for sintering.

Generally the sintering steps occur in oxygen-free conditions and the ceramic composition may first be calcined by firing in an ambient atmosphere in order to generally remove any organic additives (binders, dispersants, etc.). Burnout is accomplished by slowly heating the ceramic material between the region of 300 to 400 degrees Celsius, then continuing to heat the composition until appropriate temperature (on the order of 900 to 1100 C) to bisque fire the composition has been reached, thereby imparting some strength. The bisque fired composition can then be heated in a separate step, using the previously discussed heating profile ranges, under vacuum or a reducing atmosphere to sinter the cermet.

Alternatively, the ceramic composition may be fired in a single cycle. The binder burnout portion of the cycle is typically performed in air. Typically, the firing atmosphere remains air until a temperature range of between about 900 and about 1100 C, at which point the firing atmosphere is purged of air and replaced with a reducing atmosphere. Typically, waiting until the temperature range of 900 to 1100 Celsius reduces the likelihood of sequential reduction reactions of single metallic elements in a powder that is intended to give rise to a metal alloy phase. Thus, the atmosphere typically remains as a reducing atmosphere for the remainder of the firing cycle, including the cool down phase.

Once the sintered body is produced, it is typically annealed in hydrogen or other appropriate reducing atmospheres to improve its ability to be sensed by a metal detector.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

We claim:

1. A method for producing a metal detectible ceramic composition, comprising:
   a) mixing a first predetermined amount of a ceramic material with a second predetermined amount of a metal oxide material to define a homogeneous admixture;
   b) forming the homogeneous admixture into a green body; and
   c) sintering the green body to yield a densified body;
   wherein during sintering the metallic oxide is sintered in a reducing atmosphere to yield a plurality of metallic particles distributed therethrough; and
   wherein metallic particles have magnetic permeability of at least about $1 \times 10^{-4}$ H/m and relative magnetic permeability of at least about 8000;
   wherein the densified body is detectible by a metal detector.

2. The method of claim 1, wherein during step c) the green body is hot isostatically pressed, cold isostatically pressed, or uniaxially pressed.

3. The method of claim 1, and comprising:
   d) annealing the densified body in a reducing atmosphere.

4. The method of claim 1, wherein the reducing atmosphere is chosen from a group consisting of forming gas, ammonia, hydrogen, and combinations thereof.

5. The method of claim 1, wherein the metal oxide is reduceable to yield a high permeability metal alloy of at least 0.025 H/m and a relative permeability of at least 20000.

6. A metal detectible ceramic precursor composition, comprising:
   a ceramic matrix material powder portion;
   a plurality of metallic particles distributed throughout the ceramic matrix material powder portion; and
   organic additives distributed throughout the ceramic matrix material powder portion;
   wherein the metallic particles have magnetic permeability of at least about $1 \times 10^{-4}$ H/m and relative magnetic permeability of at least about 8000.

7. The composition of claim 6, wherein the ceramic portion is selected from the group consisting of zirconia, yttria stabilized zirconia, zirconia toughened alumina, alumina, gadolinium oxide.

8. The composition of claim 6, wherein the metallic particles comprise between about 1 and about 20 volume percent of the ceramic precursor composition; wherein the ceramic matrix portion comprises between about 80 and about 99 volume percent of the ceramic precursor composition; and wherein the organic additives comprise between about 1 and about 8 weight percent of the ceramic precursor composition.

\* \* \* \* \*